United States Patent [19]

Page et al.

[11] Patent Number: 5,173,376

[45] Date of Patent: Dec. 22, 1992

[54] METAL OXIDE HYDROGEN BATTERY HAVING SEALED CELL MODULES WITH ELECTROLYTE CONTAINMENT AND HYDROGEN VENTING

[75] Inventors: Brian M. Page, Brown Deer; Paul J. Kaprelian, Raymond; Kenneth R. Jones, Oconomowoc; Jeffrey P. Zagrodnik, Hales Corners; James T. Daley, Grafton, all of Wis.

[73] Assignee: Globe-Union Inc., Milwaukee, Wis.

[21] Appl. No.: 783,005

[22] Filed: Oct. 28, 1991

[51] Int. Cl.$^5$ .......................................... H01M 12/08
[52] U.S. Cl. ...................................... 429/86; 429/101; 429/159; 429/163
[58] Field of Search ................ 429/101, 27, 34, 35, 429/57, 26, 120, 181, 185, 206, 163, 82, 86, 159

[56] References Cited

U.S. PATENT DOCUMENTS

| | | |
|---|---|---|
| 3,669,744 | 6/1972 | Tsenter et al. |
| 4,189,527 | 1/1980 | Stadnick et al. .................... 429/26 |
| 4,327,158 | 4/1982 | Holleck ............................. 429/101 |
| 4,477,540 | 10/1984 | Miller et al. ...................... 429/27 |
| 4,517,264 | 5/1985 | Miller et al. ...................... 429/163 |
| 4,683,178 | 7/1987 | Stadnick et al. ................... 429/101 |
| 4,820,597 | 4/1989 | Lim et al. ......................... 429/50 |
| 4,923,769 | 5/1990 | Jones et al. ....................... 429/101 |
| 4,957,830 | 9/1990 | Jones .............................. 429/101 |

Primary Examiner—Anthony Skapars
Attorney, Agent, or Firm—Andrus, Sceales, Starke & Sawall

[57] ABSTRACT

A metal oxygen-hydrogen battery having sealed cell modules with electrolyte containment and hydrogen venting. The battery includes an outer pressure vessel containing a plurality of cell modules, each having a positive and negative terminal and containing a liquid electrolyte such as potassium hydroxide. Each cell module is enclosed in a flexible sealed bag which is impervious to the flow of the electrolyte. The bag is a multi layer structure preferably composed of thermoplastic film. Each bag is provided with a vent which is permeable to the flow of hydrogen gas but impermeable to the flow of the electrolyte. Electrical leads are connected to the terminals of each cell module and extend in sealed relation through the bag.

16 Claims, 1 Drawing Sheet

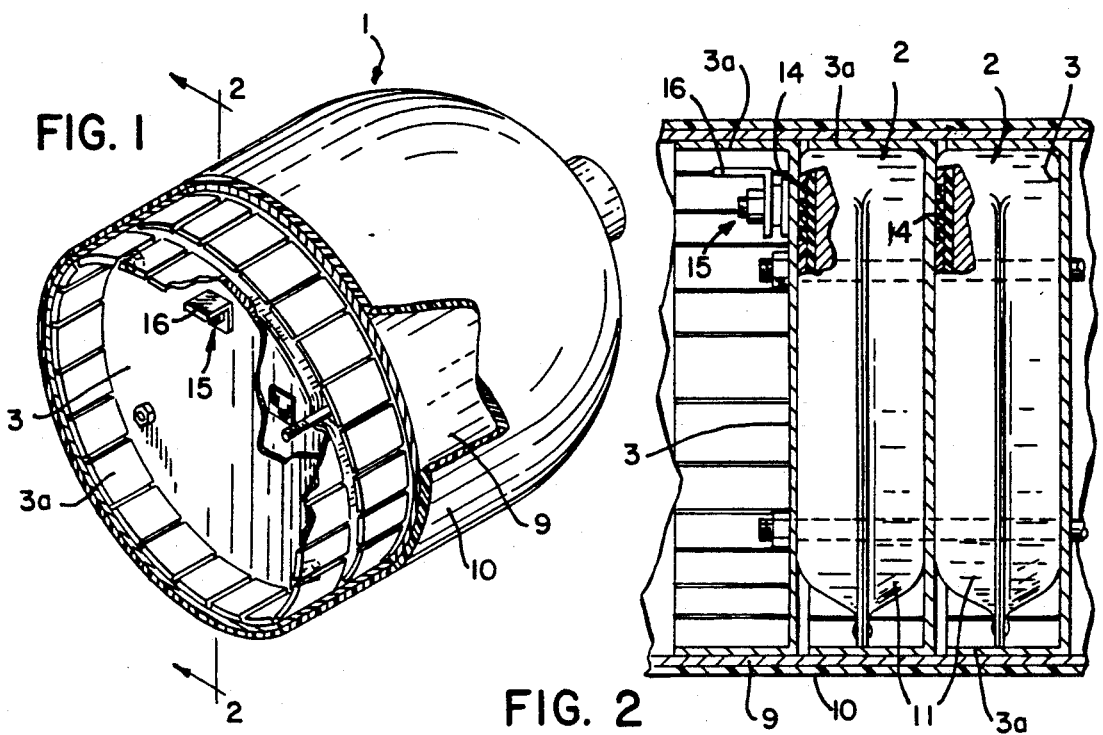
FIG. 1
FIG. 2
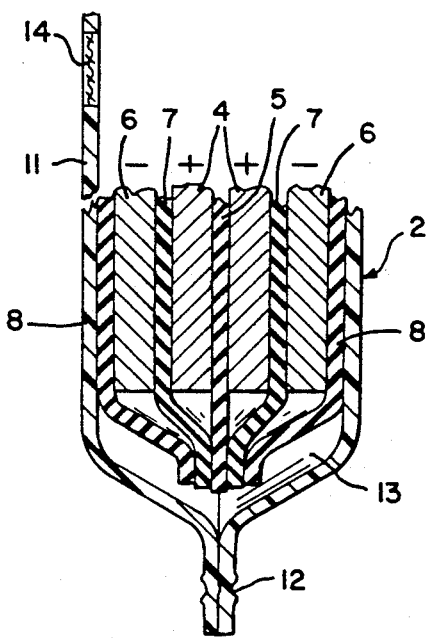
FIG. 3
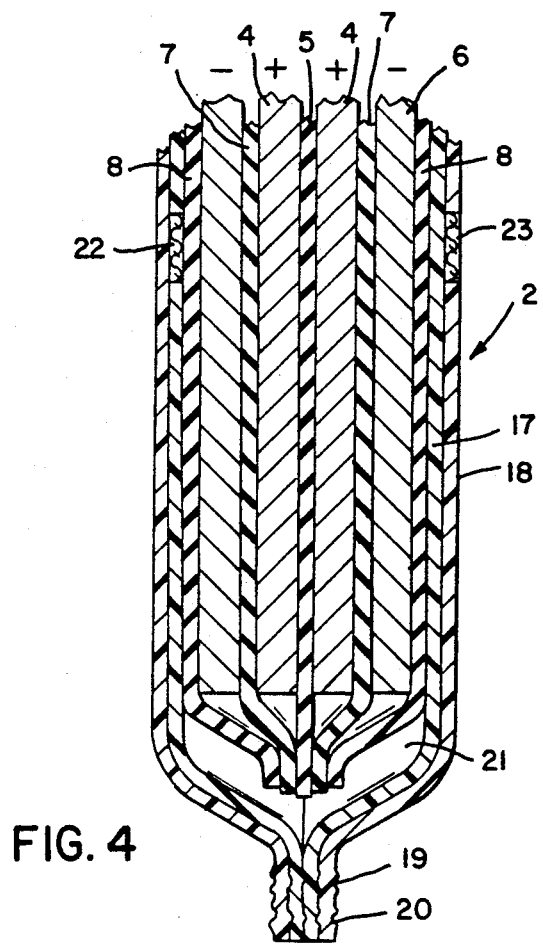
FIG. 4

METAL OXIDE HYDROGEN BATTERY HAVING SEALED CELL MODULES WITH ELECTROLYTE CONTAINMENT AND HYDROGEN VENTING

BACKGROUND OF THE INVENTION

Metal oxide-hydrogen batteries, such as nickel oxide-hydrogen batteries, have seen use as aircraft starter batteries and in aerospace applications because they are rechargeable, have an extremely long cycle life and provide a uniform output during the entire discharge cycle.

In the typical nickel oxide-hydrogen battery, the battery cells are sealed in an outer pressure vessel that contains pressurized hydrogen gas. On discharge of the battery, the hydrogen gas diffuses through the electrolyte surrounding the catalyst surfaces of the negative plates and becomes disassociated to the monoatomic form. The mono-atomic hydrogen is ionized and combines with hydroxyl ions to form water with an electron being released in the process of forming each hydrogen ion. In addition, hydroxyl ions are formed at the positive electrode by the reaction of water with the available oxygen content of the nickel oxide. As a result of these reactions, an electron current is produced in the exterior circuit.

On recharging, the reaction is reversed, with the recharging being characterized by the regeneration of hydrogen at the negative electrode and the reoxidation of nickel hydroxide at the positive electrode.

Potassium hydroxide is commonly used as the electrolyte in a metal oxide-hydrogen battery. Because of the high wetability of potassium hydroxide, extreme care must be exercised to prevent capillary migration of the potassium hydroxide and bridging between the cell modules and causing a shorting path.

If oxygen produced during the cycling of the metal oxide-hydrogen batteries escapes from the cell module, it can recombine non-uniformly in the various cell modules of the battery. Since the formation of oxygen occurs by consuming water and its recombination with hydrogen at any negative electrode forms water, the net result of non-uniform recombination can lead to drying out of some cell modules which can hinder performance of the battery and ultimately cause its failure.

SUMMARY OF THE INVENTION

The invention is directed to a metal oxidehydrogen battery having sealed cell modules with liquid electrolyte containment and free venting of hydrogen gas. More particularly, the battery includes an outer pressure vessel which contains a plurality of cell modules, each having a positive and negative terminal, and containing a liquid electrolyte, such as potassium hydroxide. Each cell module is enclosed in a flexible sealed container, such as a plastic bag, which is impervious to the flow of the liquid electrolyte and can be formed of thermoplastic film. The bag is preferably a multi-layer structure, composed of an inner nylon film sandwiched between outer layers of polyethylene film.

To permit the flow of hydrogen gas through the bag, each bag is provided with a vent, preferably formed of fibrous polytetrafluoroethylene (Gortex) which is permeable to the flow of hydrogen gas but impermeable to the flow of the liquid electrolyte. A portion of each bag is spaced from the contained cell module to provide a channel or manifold for the flow of gas within the bag.

Electrical leads are connected to the terminals of each cell module and extend in sealed relation through the bag.

In a preferred form of the invention, each cell module includes a pair of back-to-back positive electrodes and a pair of negative electrodes located adjacent the outer surface of the cell module in close proximity to the vent. By locating the negative electrode adjacent the vent, recombination of oxygen which is formed during charge of the cell module is promoted before the oxygen can escape through the vent with the hydrogen gas stream, thus minimizing the possibility of drying out of cell modules which can hinder performance of the battery.

In a modified form of the invention, each cell module is contained within a pair of superimposed flexible sealed bags and each bag is provided with a gas vent. In this arrangement the vents in the superimposed bags are not in direct alignment so that the hydrogen gas must follow a torturous path in flowing through the vents to the cell modules. The use of the double bag arrangement further insures that there will be no leakage of the electrolyte between cell modules.

The invention provides a positive containment for the liquid electrolyte to prevent the electrolyte from leaking between cell modules and forming an electrical bridge and yet the construction freely permits the passage of hydrogen gas between the cell modules and the outer pressure vessel.

By positioning the negative electrodes adjacent the vent in the bag, recombination of the oxygen is promoted before the oxygen can escape through the vent with the hydrogen gas stream, thus preventing drying out of cell modules of the battery.

Other objects and advantages will appear in the course of the following description.

DESCRIPTION OF THE DRAWINGS

The drawings illustrate the best mode presently contemplated of carrying out the invention.

In the drawings;

FIG. 1 is a perspective view of a portion of metal oxide-hydrogen battery incorporating the invention;

FIG. 2 is a portion of a longitudinal section of the battery showing a stack of cell modules;

FIG. 3 is an enlarged fragmentary cross section of a cell module; and

FIG. 4 is an enlarged fragmentary cross section of a modified form of cell module using a pair of superimposed bags.

DESCRIPTION OF THE ILLUSTRATIVE EMBODIMENT

FIG. 1 illustrates a rechargeable, metal oxide-hydrogen battery, such as a nickel oxide-hydrogen battery. The battery is composed of an outer pressure vessel 1 that houses a group of generally cylindrical cell modules 2 which are in side-by-side relation and spaced apart by separator plates 3. Plates 3 have peripheral flanges 3a that are engaged with the inner wall of vessel 1. Plates 3 serve as heat transfer members or fins to transfer heat from the cell modules to the outer vessel and the plates can be constructed as shown in the co-pending U.S. patent application Ser. No. 625,560 filed Dec. 11, 1990 now U.S. Pat. No. 5,071,652.

Each cell module 2 can be constructed as described in U.S. Pat. 4,957,830 and in general is composed of a pair of back-to-back positive electrodes 4 which are spaced apart by an electrolyte absorber layer 5, along with a pair of negative electrodes 6. The negative electrodes 6 are separated from the adjacent positive electrodes by separator layers 7. In addition, a gas diffuser screen 8 is located on the outer surface of each negative electrode 6.

Positive electrodes 4 can be in the form of flat, porous, sintered metal plaques impregnated with nickel hydroxide, while the negative electrodes are in the form of fine mesh metal screens having a catalyst, such as platinum black, bonded to one surface of the screen through a hydrophobic polymeric material. A liquid electrolyte, such as potassium hydroxide solution, is impregnated into the fibrous separator layers 5 and 7 that separate the electrodes. The cell modules 2 can be connected together either in series or parallel relation to obtain the desired voltage output.

Pressure vessel 1 can be constructed as described in U.S. Pat. No. 4,923,769, including a cylindrical shell and dome-shaped heads. Vessel 1 comprises an inner liner 9 formed as a metal, such as Inconel or stainless steel, and having an outer layer 10 of fiber reinforced resin wound around the metal liner 9 by conventional filament winding techniques.

Each cell module 2 is contained within a sealed container such as a flexible bag 11, preferably formed of thermoplastic resin. Bag 11 can be impervious to the passage of the liquid electrolyte and thus prevents the electrolyte from one cell module from migrating to an adjacent cell module and thereby bridging the modules. Bag 11 is preferably a multi-layer structure composed of a central layer of nylon film sandwiched between outer layers of polyethylene. The nylon film provides strength for the bag while the polyethylene layers aid in heat sealing the bag to provide a sealed structure.

As illustrated, the bag 11 can be an open-end structure and the cell module is inserted into the open end. The open end of the bag is then heat sealed, as indicated by joint 12, to provide a completely sealed enclosure for the cell module 2. As seen in FIG. 3, the sides and upper end of the bag are draped in contiguous relation to the corresponding sides and end of the cell module, while the lower end of the bag is spaced from the lower end of the cell module to provide a space or channel 13 for the flow of hydrogen gas.

To permit the flow of hydrogen gas between the cell modules and the interior of the pressure vessel 1, each bag is provided with one or more vents 14. Vents 14 are permeable to the flow of hydrogen gas but impermeable to the flow of the liquid electrolyte so that the electrolyte cannot pass through the vents to the exterior of the bag. Vents 14 are preferably formed of a material sold under the trade name Gortex which is composed of Teflon fibers (polytetrafluoroethylene).

The positive and negative electrodes 4, 6 of the cell modules 2 can be connected together in the desired manner by a conductor mechanism 15 of the type described in co-pending U.S. patent application Ser. No. 07/783,006 filed Oct. 28, 1991 and which extends in sealed relation through aligned openings in each of the bags 11. A positive terminal bracket 16 is connected to one end of the conductor mechanism 15, while a negative terminal bracket, not shown, can be connected to the opposite end of the conductor mechanism.

FIG. 4 shows a modified form of the invention in which each cell module 2 is enclosed by a pair of superimposed bags 17 and 18. The bags 17 and 18 are constructed similar to bags 11 of the first embodiment and are preferably formed of a thermoplastic material which is impervious to the flow of the liquid electrolyte. As shown in FIG. 4, the lower open ends of bags 17 and 18 are brought together into contiguous relation and joined together by a pair of spaced heat seals 19 and 20. The use of a pair of spaced heat seals further insures that bags will be sealed and there will be no leakage of electrolyte through the sealed areas. As in the case of the first embodiment, the lower end of the inner bag 17 is spaced from the corresponding end of the cell module 2 to provide a space 21 which serves as manifold or channel for the flow of hydrogen gas in the cell module.

Inner bag 17 is formed with a vent 22, similar in construction to vent 17 of the first embodiment. Outer bag 18 is also formed with a vent 23 of similar construction. Vents 22 and 23 are preferably located on opposite faces of the cell module and are not in direct alignment, thus providing a torturous path for the flow of any liquid electrolyte that may possibly escape through the vent 22 in the inner bag.

With the construction of the invention the electrolyte is fully contained within each cell module by the sealed container or bag thus preventing the electrolyte from bridging from one cell module to another and causing a shorting path.

As a further advantage, the vents 14, 22 and 23 are located adjacent the negative electrodes of the cell modules. This location of the vent in close proximity to the negative electrode promotes the recombination of oxygen with hydrogen at the negative electrode, resulting in a more uniform recombination and preventing drying out of cell modules in the battery.

While the description has illustrated the cell modules as being generally cylindrical, it is contemplated that the cell modules can have different configurations, as for example, semi-cylindrical or rectangular.

Various modes of carrying out the invention are contemplated as being within the scope of the following claims particularly pointing out and distinctly claiming the subject matter which is regarded as the invention.

We claim:

1. In a metal oxide-hydrogen battery, a pressure vessel, a plurality of cell modules disposed in the pressure vessel and each cell module having a positive electrode and a negative electrode, a liquid electrolyte contained in each cell module, a sealed container composed of an electrically insulating material enclosing each cell module, said container being impervious to the flow of said liquid electrolyte, vent means disposed in each container, said vent means being permeable to the flow of hydrogen gas and impermeable to the flow of said liquid electrolyte, and electrical conductor means extending in sealed relation into each container and connecting said electrodes in an exterior circuit.

2. The battery of claim 1, wherein each cell module includes a pair of positive electrodes and a pair of negative electrodes, said positive electrodes being disposed in back-to-back insulated relation and said negative electrodes being disposed adjacent the outer surface of said cell module, said vent means being disposed adjacent a negative electrode.

3. The battery of claim 1, wherein a portion of the container is out of contact with the corresponding cell module to provide a space therebetween for the flow of gas.

4. The battery of claim 1, wherein said container is provided with a fused seam, said seam being spaced from said cell to provide a space therebetween for the flow of gas.

5. The battery of claim 1, wherein each cell module includes a pair of opposed faces, said container having a pair of generally parallel side surfaces each disposed in generally contiguous relation to a face of said cell module.

6. The battery of claim 1, wherein each cell module is generally semi-cylindrical in configuration and includes a curved peripheral surface, a portion of said container being spaced from said peripheral surface to provide a chamber for the flow of gas therein.

7. In a metal oxide-hydrogen battery, an outer pressure vessel, a plurality of cell modules disposed in said pressure vessel with each cell module having a positive electrode and a negative electrode, a liquid electrolyte disposed within each cell module, a pair of sealed containers disposed in superimposed relation around each cell module, each container being composed of an electrically insulating material and being impervious to the flow of said liquid electrolyte, a vent disposed in each container with said vents being permeable to the flow of hydrogen and impermeable to the flow of said liquid electrolyte, and electrical conductor means extending in sealed relation through said containers and into contact with said electrodes for connecting said electrodes in an exterior circuit.

8. The battery of claim 7, wherein said vents are out of direct alignment.

9. The battery of claim 7, wherein each container comprises a flexible plastic bag.

10. The battery of claim 9, wherein each bag is composed of a film of nylon sandwiched between outer films of polyethylene.

11. The battery of claim 7, wherein said vents are disposed at opposite surfaces of the respective cell module.

12. The battery of claim 7, wherein each vent is composed of polytetrafluoroethylene fibers.

13. The battery of claim 7, wherein a portion of the inner bag is spaced from said cell module to provide a chamber for the flow of hydrogen gas.

14. A metal oxide-hydrogen battery, comprising an outer pressure vessel, a cell module disposed within the pressure vessel and having a positive electrode and a negative electrode, a liquid electrolyte impregnated within said cell module, a flexible sealed bag composed of thermoplastic material encapsulating said cell module, said thermoplastic material being impermeable to the flow of liquid electrolyte, vent means disposed in the bag and characterized by being permeable to the flow of hydrogen gas and impermeable to the flow of said liquid electrolyte, said negative electrode being disposed adjacent said vent means, and electrical conductor means extending in sealed relation through said bag and into contact with said electrodes to connect said electrodes in an exterior circuit.

15. The battery of claim 14, and including a second flexible sealed bag disposed around said first bag, and second vent means in said second bag, said second vent means being characterized by being impermeable to the flow of hydrogen gas and impermeable to the flow of the liquid electrolyte, said second vent means being disposed out of direct alignment with said first vent means.

16. The battery of claim 1, wherein said container is a flexible plastic bag.

* * * * *